United States Patent
Sherman (10) Patent No.: US 11,685,539 B2
(45) Date of Patent: Jun. 27, 2023

(54) PASSIVE INTERNAL COMPARTMENT EXHAUST FOR AN AIRCRAFT PROPULSION SYSTEM

(71) Applicant: Rohr, Inc., Chula Vista, CA (US)

(72) Inventor: Brian A. Sherman, Chula Vista, CA (US)

(73) Assignee: Rohr, Inc., Chula Vista, CA (US)

(*) Notice: Subject to any disclaimer, the term of this patent is extended or adjusted under 35 U.S.C. 154(b) by 207 days.

(21) Appl. No.: 17/032,154

(22) Filed: Sep. 25, 2020

(65) Prior Publication Data
US 2021/0095578 A1   Apr. 1, 2021

Related U.S. Application Data

(60) Provisional application No. 62/907,236, filed on Sep. 27, 2019.

(51) Int. Cl.
| | | |
|---|---|---|
| *B64D 29/00* | (2006.01) | |
| *B64D 33/04* | (2006.01) | |
| *F02K 1/82* | (2006.01) | |
| *F01D 25/24* | (2006.01) | |
| *B64D 27/10* | (2006.01) | |
| *B64D 29/08* | (2006.01) | |
| *F01D 25/30* | (2006.01) | |
| *F02C 9/16* | (2006.01) | |

(52) U.S. Cl.
CPC .............. *B64D 29/00* (2013.01); *B64D 33/04* (2013.01); *F01D 25/24* (2013.01); *F02K 1/822* (2013.01); *B64D 27/10* (2013.01); *B64D 29/08* (2013.01); *F01D 25/30* (2013.01); *F02C 9/16* (2013.01)

(58) Field of Classification Search
CPC ........ B64D 29/00; B64D 33/04; B64D 27/10; B64D 29/08; F01D 25/24; F01D 25/30; F02K 1/822; F02K 1/386; F02C 9/16; F05D 2240/127; F05D 2240/128
See application file for complete search history.

(56) References Cited

U.S. PATENT DOCUMENTS

| | | |
|---|---|---|
| 2,049,751 A | 8/1936 | Shoemaker |
| 3,883,095 A | 5/1975 | Fletcher et al. |
| 4,279,382 A | 7/1981 | Wilson, Jr. |
| 4,825,644 A | 5/1989 | Bubello |
| 5,623,820 A * | 4/1997 | Balzer .................... B64D 29/02 60/39.83 |

(Continued)

OTHER PUBLICATIONS

EP search report for EP20198530.6 dated Feb. 26, 2021.

*Primary Examiner* — Gerald L Sung
*Assistant Examiner* — Rene D Ford
(74) *Attorney, Agent, or Firm* — Getz Balich LLC (57) ABSTRACT

An assembly is provided for an aircraft propulsion system. This assembly includes a nacelle inner structure that extends axially along and circumferentially about an axial centerline. The nacelle inner structure includes an internal compartment and a cowl. The internal compartment is configured to house a core of a gas turbine engine. The cowl is configured to form an outer radial periphery of the internal compartment. An aft end portion of the cowl is also configured to form an outer radial periphery of a compartment exhaust to the internal compartment. The aft end portion of the cowl includes a plurality of axial fingers arranged circumferentially about the axial centerline in an array.

16 Claims, 8 Drawing Sheets

(56) References Cited

U.S. PATENT DOCUMENTS

| | | | | |
|---|---|---|---|---|
| 5,704,207 | A | 1/1998 | Jensen | |
| 8,875,518 | B2 * | 11/2014 | Le Docte | B64D 29/06 60/226.3 |
| 10,167,814 | B2 | 1/2019 | Ferrier | |
| 2008/0202847 | A1 * | 8/2008 | Porte | F02K 3/06 181/213 |
| 2011/0036068 | A1 * | 2/2011 | Lefebvre | F02K 1/48 60/262 |
| 2013/0056553 | A1 * | 3/2013 | Mouchoux | F02K 1/48 239/265.17 |
| 2015/0107225 | A1 * | 4/2015 | Dindar | B64D 33/06 29/888.012 |
| 2016/0047274 | A1 | 2/2016 | Woolworth | |
| 2016/0131077 | A1 * | 5/2016 | Debray | F02K 3/04 60/770 |
| 2017/0009599 | A1 | 1/2017 | Dahmen | |

* cited by examiner

PASSIVE INTERNAL COMPARTMENT EXHAUST FOR AN AIRCRAFT PROPULSION SYSTEM

CROSS-REFERENCE TO RELATED APPLICATIONS

This application claims priority to U.S. Provisional Patent Application No. 62/907,236 filed Sep. 27, 2019, which is hereby incorporated herein by reference in its entirety.

BACKGROUND

1. Technical Field

This disclosure relates generally to an aircraft propulsion system and, more particularly, to a pressure relief system for an internal compartment within the aircraft propulsion system.

2. Background Information

Figure 9:
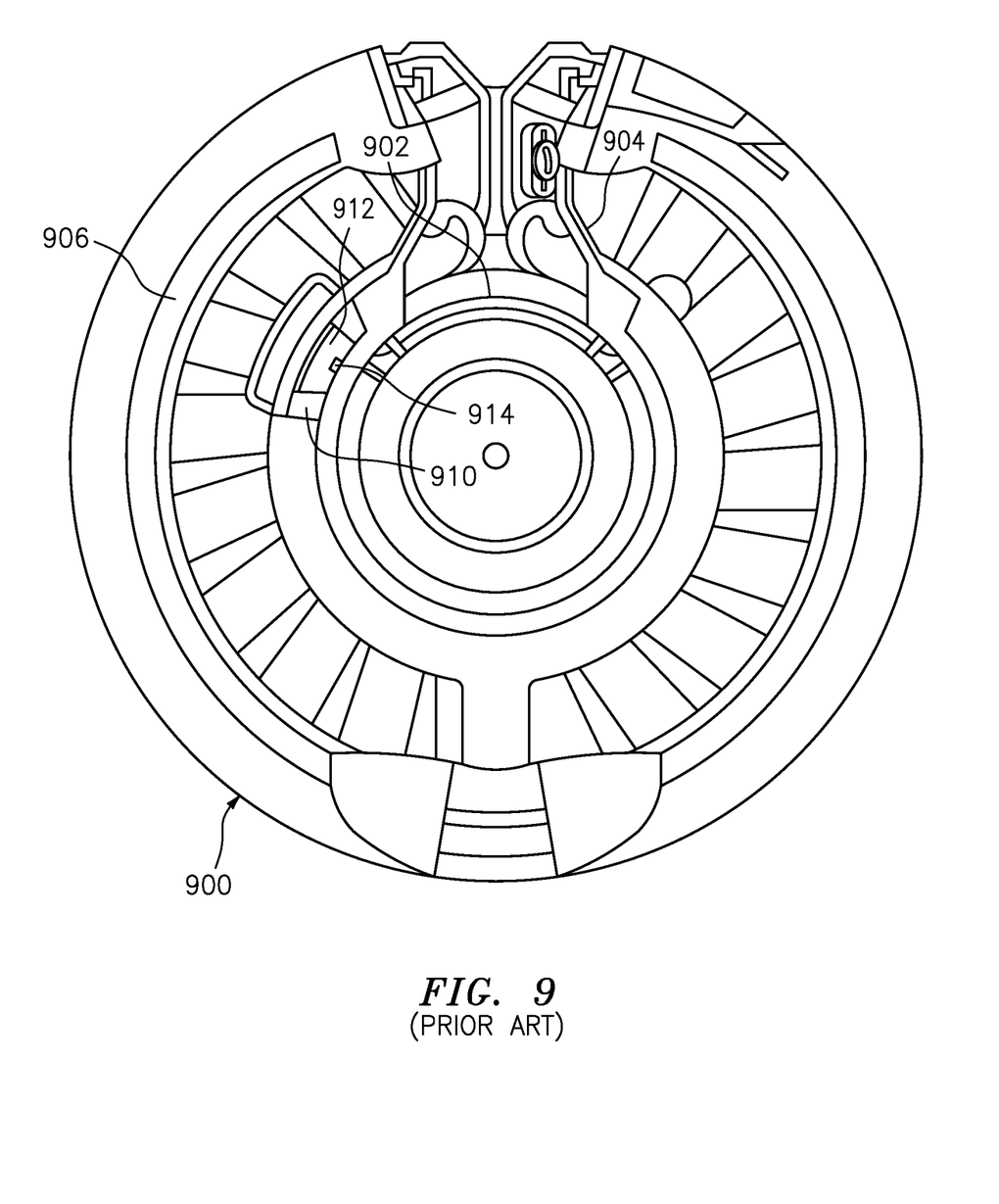
FIG. 9 is a partial illustration of a prior art aircraft propulsion system.

U.S. Patent Application Publication No. 2017/0009599 discloses a pressure relief door assembly. Referring to FIG. 9, an engine nacelle 900 includes an engine assembly 902, an inner fixed structure 904 and an outer structure 906 that surrounds the inner fixed structure 904. The inner fixed structure 904 forms an aerodynamic fairing around and provides a pressure relief door frame 910 for a pressure relief door 912. The pressure relief door 912 provides a means of relieving the compartment pressure in the event of a failure of a compressed air duct associated with the engine assembly 902.

Figure 10:
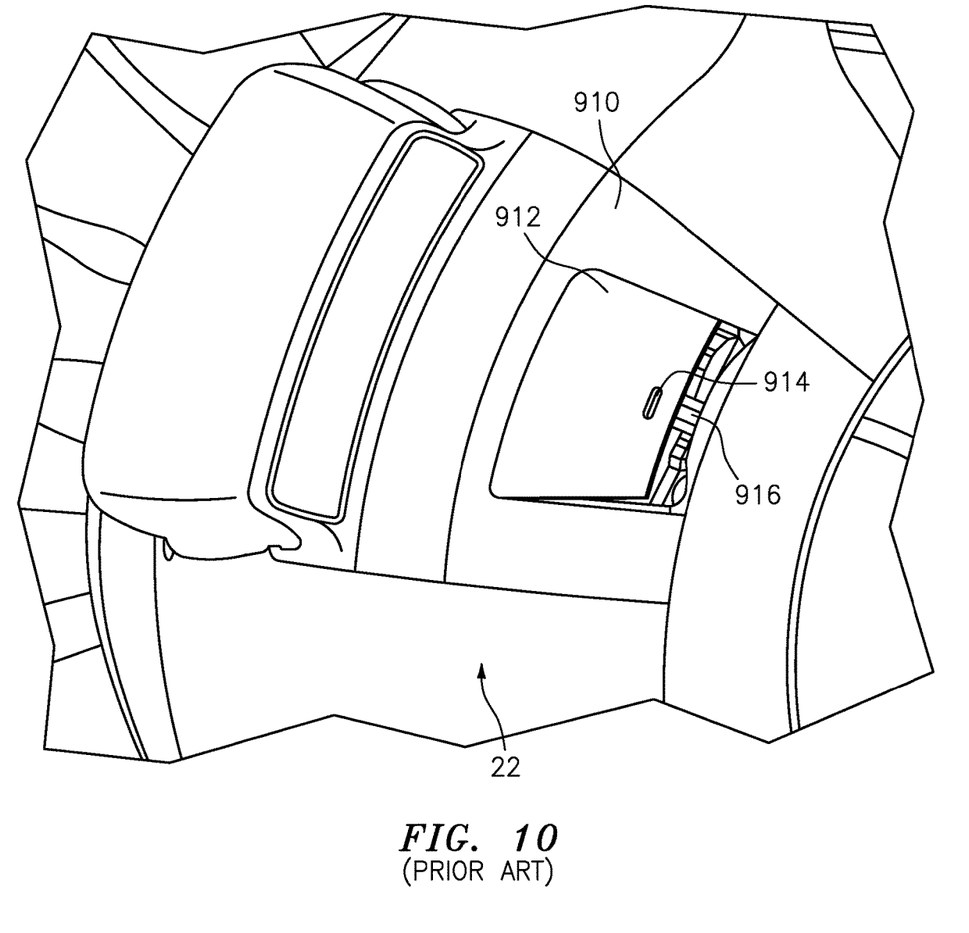
FIG. 10 is an enlarged illustration of the aircraft propulsion system of FIG. 9.

The outer structure 906 provides a generally annular element with an aerodynamic taper that narrows toward the trailing end of the engine nacelle 900. The inner fixed structure 904 includes the engine pressure relief door frame 910, the pressure relief door 912 that is hinge-coupled to the engine pressure relief door frame 910, and a latch element 914. The engine pressure relief door frame 910 can serve as a frame for the pressure relief door 912 that attaches to the inner fixed structure 904 (i.e., a housing) or, in some cases, the pressure relief door 912 can include a door and a hinge that attaches directly to the inner fixed structure 904. The latch element 914 may include a spring-loaded element 916 (see FIG. 10) and is configured to normally remain in a latched condition to thereby maintain the pressure relief door 912 in a closed condition. However, the latch element 914 may also assume an unlatched condition to thereby permit the pressure relief door 912 to assume an open condition in accordance with an occurrence of a burst duct event in any one or more of multiple ducts to relieve excess pressures.

There is a need in the art for an improved systems and methods for preventing structural damage in the event of a highly-pressurized duct burst.

SUMMARY OF THE DISCLOSURE

According to an aspect of the present disclosure, an assembly is provided for an aircraft propulsion system. This aircraft propulsion system assembly includes a nacelle inner structure that extends axially along and circumferentially about an axial centerline. The nacelle inner structure includes an internal compartment and a cowl. The internal compartment is configured to house a core of a gas turbine engine. The cowl is configured to form an outer radial periphery of the internal compartment. An aft end portion of the cowl is also configured to form an outer radial periphery of a compartment exhaust to the internal compartment. The aft end portion of the cowl includes a plurality of axial fingers arranged circumferentially about the axial centerline in an array.

According to another aspect of the present disclosure, another assembly is provided for an aircraft propulsion system. This aircraft propulsion system assembly includes a nacelle inner structure that includes an internal compartment and an inner barrel. The internal compartment is configured to house a core of a gas turbine engine. The inner barrel extends circumferentially about and axially along the internal compartment. An aft end portion of the inner barrel is configured to at least partially form a compartment exhaust for the internal compartment. The aft end portion of the inner barrel is also configured to passively deform to increase a cross-sectional area of the compartment exhaust when fluid pressure within the internal compartment rises above a predetermined value.

According to still another aspect of the present disclosure, another assembly is provided for an aircraft propulsion system. This aircraft propulsion system assembly includes a nacelle inner structure and a gas turbine engine. The nacelle inner structure includes an internal compartment and an inner barrel. An aft end portion of the inner barrel is configured to at least partially form a compartment exhaust for the internal compartment. The compartment exhaust is configured to direct fluid out of the internal compartment into an environment outside of the aircraft propulsion system. The gas turbine engine includes an engine core housed within the internal compartment. The aft end portion of the inner barrel includes a plurality of slots arranged circumferentially about an axial centerline of the aircraft propulsion system. Each of the slots extends partially axially into the inner barrel from an aft end of the inner barrel.

The aft end portion of the inner barrel may include a plurality of fingers arranged circumferentially about the axial centerline. Each of the slots may be formed by and located between a respective circumferentially adjacent pair of the fingers.

The aft end portion of the inner barrel may include a plurality of fingers arranged circumferentially about an axial centerline.

The aft end portion of the inner barrel may include a plurality of first fingers and a plurality of second fingers. The first fingers may be arranged in a first array about an axial centerline. The second fingers may be arranged in a second array about the axial centerline. The first array may circumscribe and may be configured to radially engage the second array.

Each of the first fingers may be configured to radially contact each second finger in a respective neighboring pair of the second fingers. In addition or alternatively, each of the second fingers may be configured to radially contact each first finger in a respective neighboring pair of the first fingers.

Each of the axial fingers may be configured to deflect radially outward when fluid pressure within the internal compartment rises over a predetermined value.

Each of the axial fingers may be configured to passively move between a radial inner position and a radial outer position.

One or more of the axial fingers may be configured to passively move to change a cross-sectional area of the compartment exhaust.

A slot may be formed by and between a neighboring pair of the axial fingers.

The slot may extend axially into the cowl from an aft end of the cowl.

The axial fingers may be a plurality of first axial fingers. The array may be a first array. The aft end portion of the cowl may also include a plurality of second axial fingers arranged circumferentially about the axial centerline in a second array. The first array may be radially outboard of and may overlap the second array.

A first of the first axial fingers may axially and/or circumferentially overlap a neighboring pair of the second axial fingers.

A first of the second axial fingers may axially and/or circumferentially overlap a neighboring pair of the first axial fingers.

The first axial fingers and the second axial fingers may be circumferentially staggered.

A first of the first axial fingers may radially engage a first of the second axial fingers.

The aircraft propulsion system assembly may also include a core nozzle configured to form an inner radial periphery of the compartment exhaust and to form an outer radial periphery of a core exhaust.

The cowl may also be configured to form an inner radial periphery of a bypass flowpath within the aircraft propulsion system.

The aircraft propulsion system assembly may also include the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
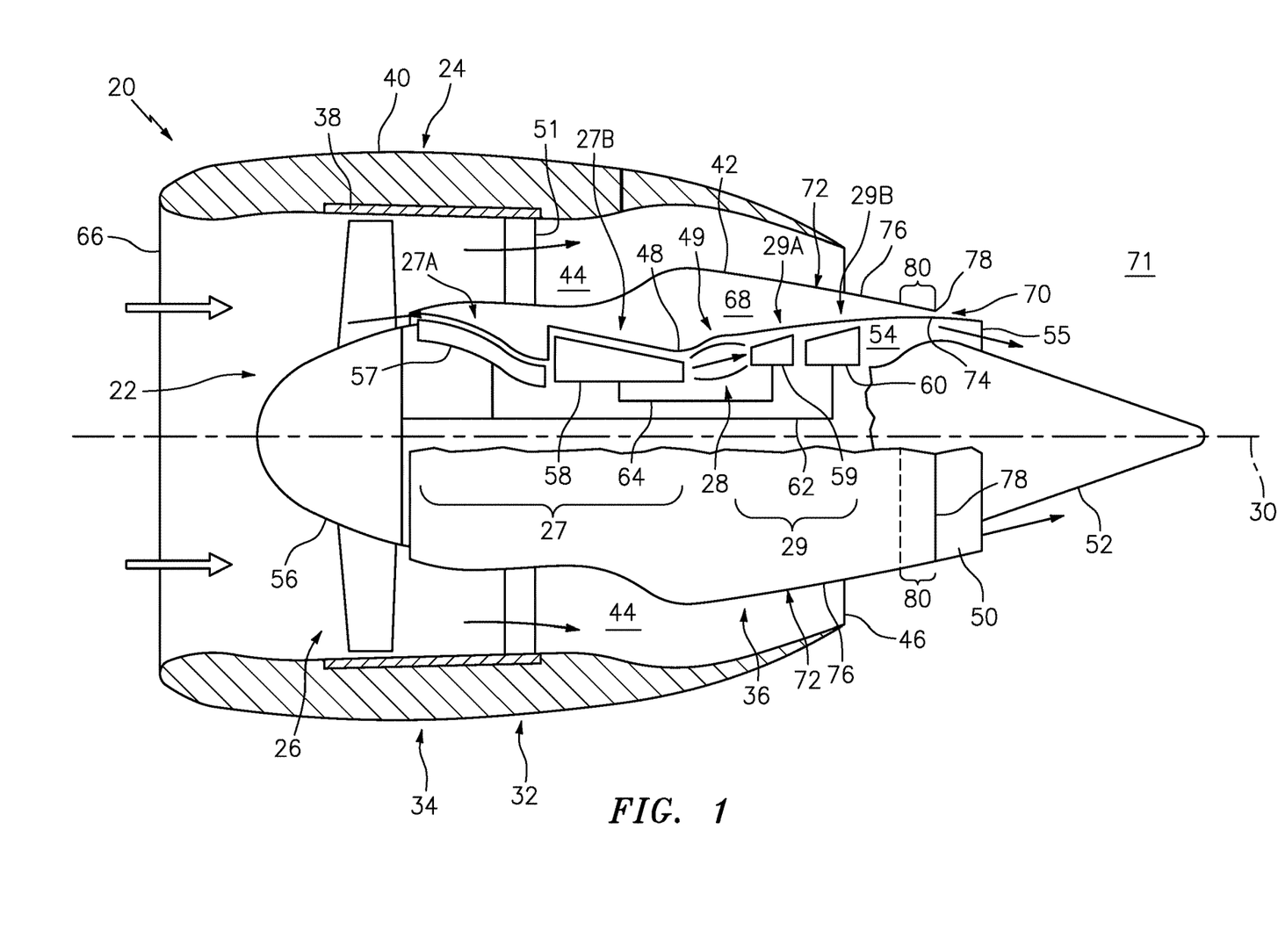
FIG. 1 is a schematic side cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the aircraft propulsion system 20 and its gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., a nacelle outer structure. The outer case 38 houses at least the fan section 26.

The nacelle outer structure 40 houses and provides an aerodynamic cover for the outer case 38. The nacelle outer structure 40 also covers a forward portion of an inner structure 42 of the nacelle 24; i.e., a nacelle inner structure, which may also be referred to as an inner fixed structure ("IFS"). More particularly, the nacelle outer structure 40 axially overlaps and extends circumferentially about (e.g., partially or completely around) the nacelle inner structure 42. The nacelle outer structure 40 and the nacelle inner structure 42 thereby at least partially or completely form a bypass flowpath 44. This bypass flowpath 44 extends axially along the centerline 30 within the aircraft propulsion system 20 to a bypass exhaust 46 (e.g., a bypass nozzle outlet), where the bypass flowpath 44 is radially between the nacelle structures 34 and 36.

The inner housing structure 36 includes an inner case 48 (e.g., a core case) and the nacelle inner structure 42. The inner case 48 houses one or more of the engine sections 27A-29B, which engine sections 27A-29B may be collectively referred to as a core 49 of the gas turbine engine 22. The inner case 48 and/or, more generally, the inner housing structure 36 may be connected to the outer case 38 and/or, more generally, the outer housing structure 34 by one or more supports 51 (e.g., guide vanes, struts, etc.), which extend radially between the cases 48 and 38 to support the outer housing structure 34 and its outer case 38.

The nacelle inner structure 42 houses and provides an aerodynamic cover for the inner case 48. A downstream/aft portion of the inner housing structure 36 such as, for example, a core nozzle 50 of the nacelle inner structure 42 also covers at least a portion of an exhaust center body 52. More particularly, the nacelle inner structure 42 and its core nozzle 50 axially overlap and extend circumferentially about (e.g., partially or completely around) the exhaust center body 52. The core nozzle 50 and the exhaust center body 52 thereby collectively form a downstream/aft portion of a core flowpath 54. This core flowpath 54 extends axially within the aircraft propulsion system 20, through the engine sections 27A-29B, to a core exhaust 55 (e.g., a core nozzle outlet) at a downstream/aft end of the aircraft propulsion system 20.

Each of the engine sections 26, 27A, 27B, 29A and 29B of FIG. 1 includes a respective rotor 56-60. Each of these rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system housing 32 (e.g., the inner case 48) by at least one stationary structure such as, for example, an annular support strut.

During operation, air enters the aircraft propulsion system 20 through an airflow inlet 66. This air is directed through the fan section 26 and into the core flowpath 54 and the bypass flowpath 44. The air within the core flowpath 54 may be referred to as "core air". The air within the bypass flowpath 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flow path 44. The propulsion of the bypass air may account for a majority of thrust generated by the turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above.

To cool components (e.g., auxiliary components) configured with and/or attached to the engine core 49 and its inner case 48, cooling fluid may be directed into an internal compartment 68 (e.g., a core compartment) of the inner housing structure 36 and its nacelle inner structure 42. The cooling fluid may be gas (e.g., compressed air) bleed from the bypass flowpath 44 and/or the core flowpath 54 forward of the combustor section 28. After cooling the components, the cooling fluid may be exhausted/expelled from the internal compartment 68 through an internal compartment exhaust 70 (e.g., a compartment nozzle outlet) for the internal compartment 68 and into an environment 71 outside of the nacelle 24 and, more generally for example, outside of the aircraft propulsion system 20.

The compartment exhaust 70 of FIG. 1 is formed by and extends radially between an inner barrel 72 of the nacelle inner structure 42 and a fixed structure 74, which fixed structure 74 may be configured as or positioned axially next to the core nozzle 50. The inner barrel 72 may be configured as or otherwise include one or more core cowls 76. Thus, the inner barrel 72 and its core cowls 76 at least partially or completely form an outer radial periphery of the compartment exhaust 70 at (e.g., on, adjacent or proximate) an aft end 78 of the inner barrel 72 and its core cowls 76. The fixed structure 74 of FIG. 1 at least partially or completely forms an inner radial periphery of the compartment exhaust 70.

At least an aft end portion 80 of the inner barrel 72 and/or one or each core cowl 76 is configured to passively flex, deform, deflect and/or otherwise move such that a cross-sectional area of the compartment exhaust 70 (e.g., when viewed in a plane perpendicular to the axial centerline 30) can change (e.g., increase, decrease) in order to accommodate changing mass flows of the fluid being exhausted from the internal compartment 68. For example, under a burst duct condition, the aft end portion 80 is configured to passively flex, deform, deflect and/or otherwise move radially outward (e.g., away from the axial centerline 30) to enable additional fluid to flow through the compartment exhaust 70 when, for example, fluid pressure within the internal compartment 68 rises above a predetermined value; e.g., a value associated with the burst duct condition. This may enable the compartment exhaust 70 to accommodate the additional mass flow of fluid into the internal compartment 68 without causing additional damage to the nacelle inner structure 36. Note, the term "passive" may describe a component that flexes, deforms, deflects and/or otherwise moves without initiation by and/or action from an actuator; e.g., a motor, a piston, etc. By contrast, the term "active" may describe a component that moves after initiation and/or by way of action from an actuator.

Figure 2:
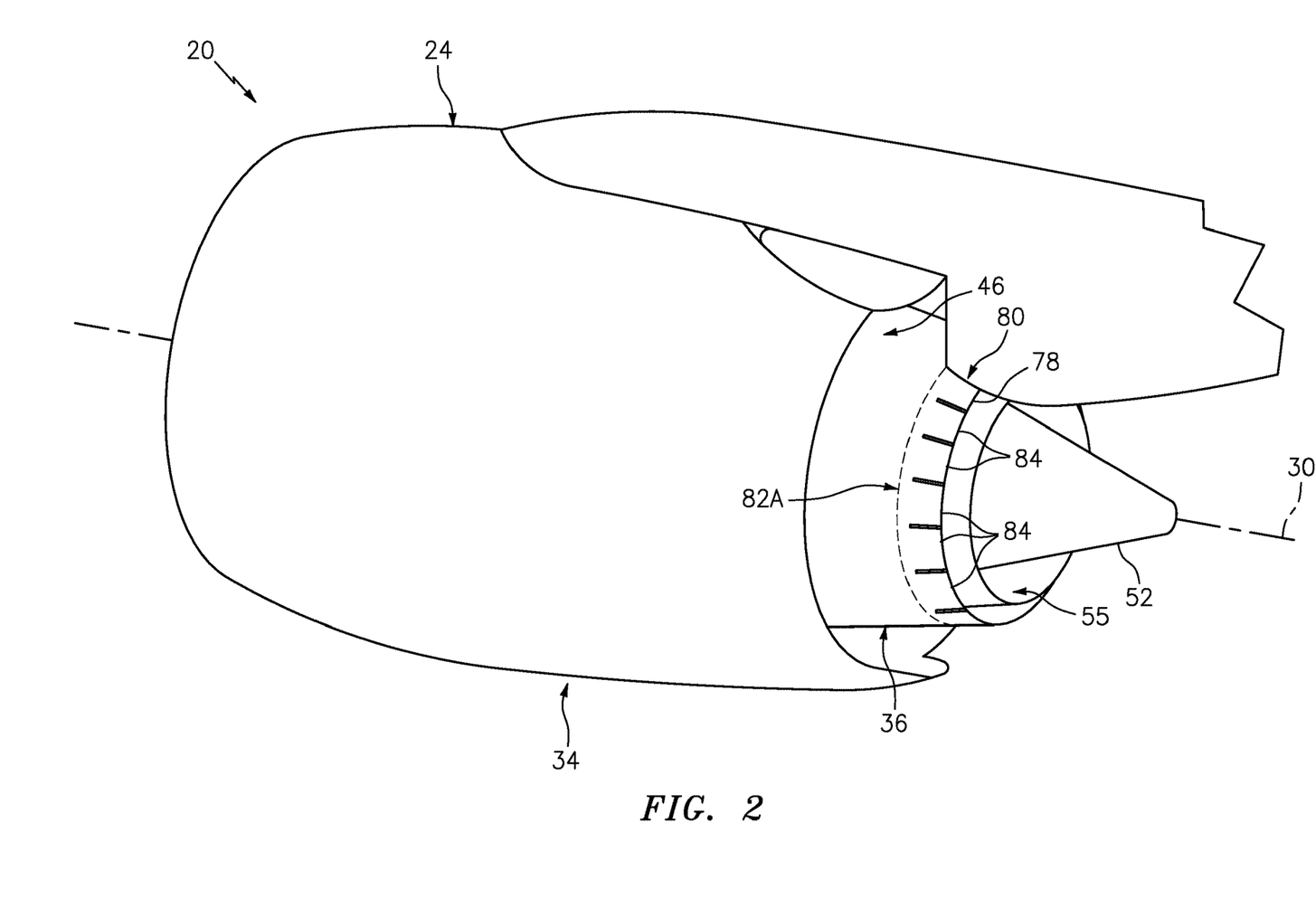
FIG. 2 is a perspective illustration of the aircraft propulsion system.

Referring to FIG. 2, the aft end portion 80 may have a turkey feather configuration. The aft end portion 80 of FIG. 3, for example, is configured with one or more arrays 82A and 82B (generally referred to as "82") of one or more (e.g., axial, axially extending) fingers 84A and 84B (generally referred to as "84"). Each of these arrays 82 is located at the aft end 78 of the inner barrel 72 and/or the core cowls 76. Each of the arrays 82 extends circumferentially about (e.g., substantially or completely around) the axial centerline 30. The radial inner array 82B and, thus, its radial inner fingers 84B are arranged radially inward of and (e.g., circumferentially and/or axially) overlap and are (e.g., circumferentially and/or axially) aligned with the radial outer array 82A and, thus, its radial outer fingers 84A. The radial outer array 82A and, thus, its radial outer fingers 84A are arranged radially outward of and (e.g., circumferentially and/or axially) overlap and are (e.g., circumferentially and/or axially) aligned with the radial inner array 82B and, thus, its radial inner fingers 84B. The radial outer array 82A thereby circumscribes the radial inner array 82B.

Figure 3:
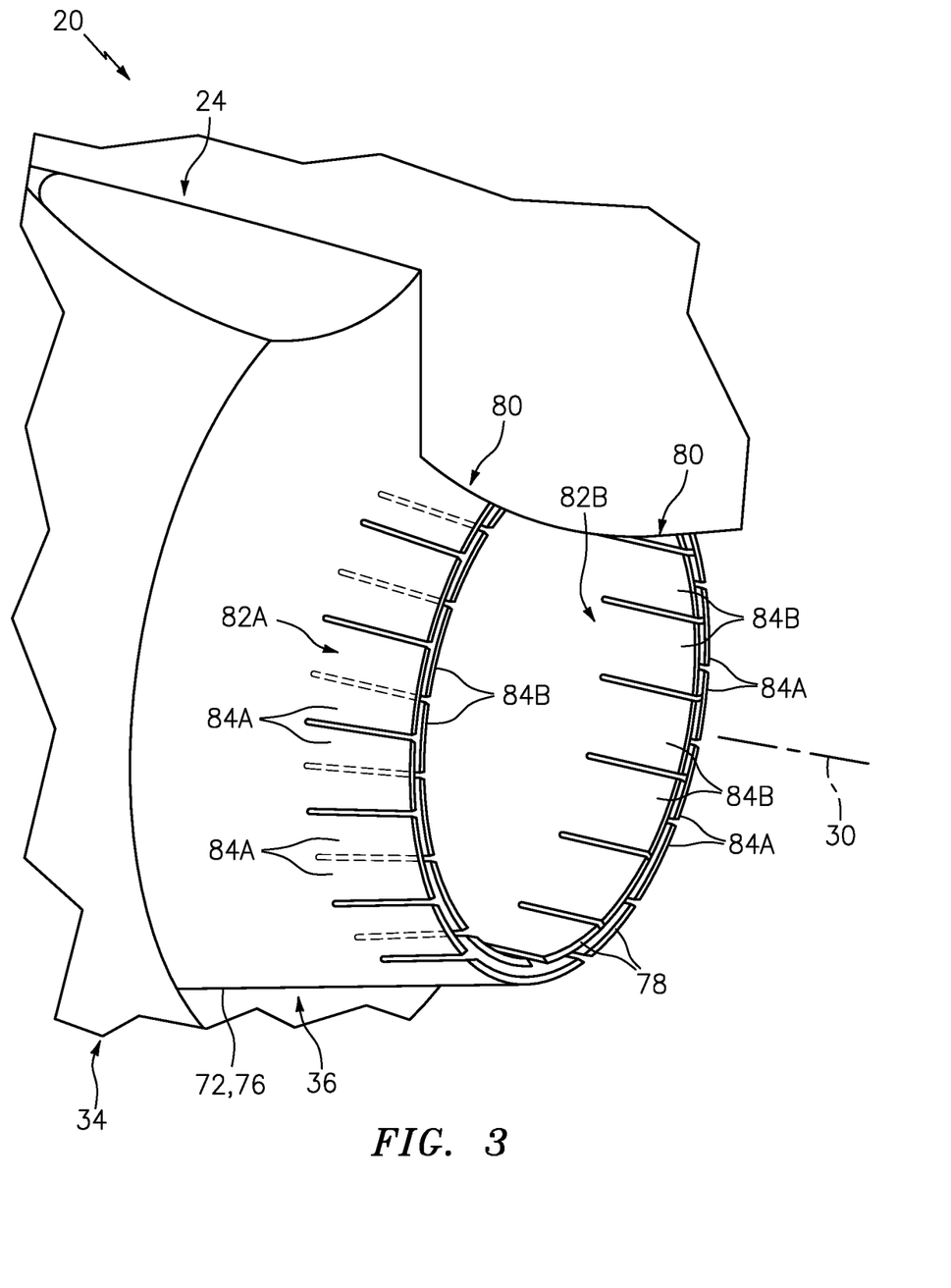
FIG. 3 is a perspective illustration of an aft portion of the aircraft propulsion system.

The radial outer array 82A of FIG. 3 includes a plurality of radial outer (e.g., axial, axially extending) fingers 84A. These radial outer fingers 84A are arranged circumferentially about (e.g., substantially or completely around) the axial centerline 30 to provide the radial outer array 82A; e.g., an arcuate or annular array.

Figure 4:
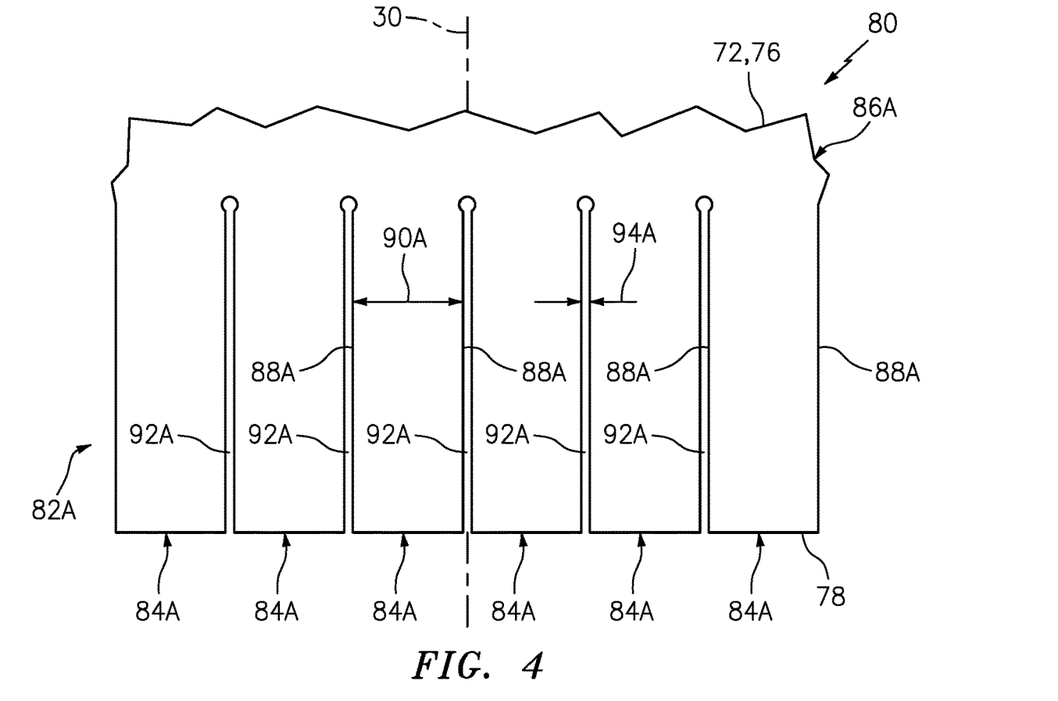
FIG. 4 is a partial side view illustration of an array of radial outer fingers partially forming a compartment exhaust.

Referring to FIG. 4, each of the radial outer fingers 84A extends axially out from a base 86A of the inner barrel 72 and/or of a respective core cowl 76 to the aft end 78. Each of the radial outer fingers 84A extends laterally (e.g., circumferentially or tangentially) between opposing sides 88A of the respective finger 84A. A lateral width 90A of one, some or each of the radial outer fingers 84A may be uniform (e.g., constant) along a portion or an entirety of an axial length of the respective finger 84A. Alternatively, the lateral width 90A of one, some or each of the radial outer fingers 84A may change along a portion or the entirety of the axial length of the respective finger 84A to provide the respective finger 84A with, for example, a tapered geometry.

The radial outer fingers 84A are arranged side-by-side in a spaced manner so as to form a plurality of radial outer (e.g., axial, axially extending) slots 92A in an array about the axial centerline 30. Each of these radial outer slots 92A is formed by and is located laterally between a respective laterally neighboring (e.g., adjacent) pair of the radial outer fingers 84A. Each of the radial outer slots 92A extends completely radially through a body/ply of material that forms the radial outer fingers 84A. Each of the radial outer slots 92A extends partially axially into the aft end portion 80 from the aft end 78 to the base 86A. A lateral width 94A of one, some or each of the radial outer slots 92A may be uniform (e.g., constant) along a portion or an entirety of an axial length of the respective slot 92A. Alternatively, the lateral width 94A of one, some or each of the radial outer slots 92A may change along a portion or the entirety of the axial length of the respective slot 92A to provide the respective slot 92A with, for example, a tapered geometry.

The radial inner array 82B of FIG. 3 includes a plurality of radial inner (e.g., axial, axially extending) fingers 84B. These radial inner fingers 84B are arranged circumferentially about (e.g., substantially or completely around) the axial centerline 30 to provide the radial inner array 82B; e.g., an arcuate or annular array.

Figure 5:
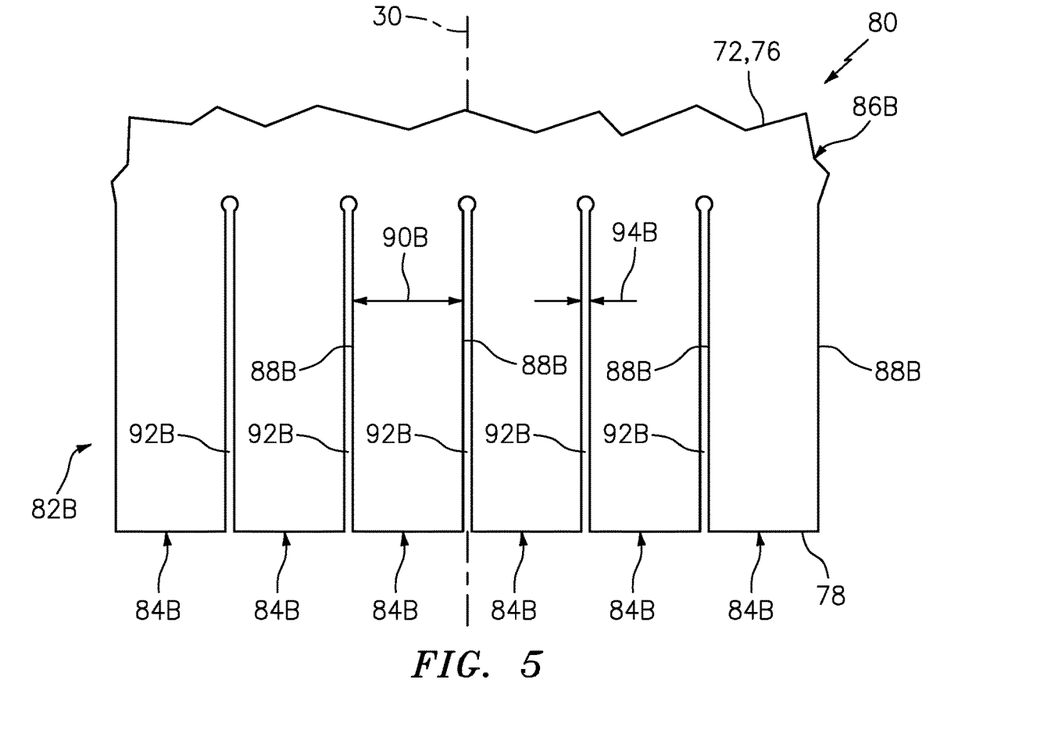
FIG. 5 is a partial side view illustration of an array of radial inner fingers partially forming the compartment exhaust.

Referring to FIG. 5, each of the radial inner fingers 84B extends axially out from a base 86B of the inner barrel 72 and/or of a respective core cowl 76 to the aft end 78. Each of the radial inner fingers 84B extends laterally (e.g., circumferentially or tangentially) between opposing sides 88B of the respective finger 84B. A lateral width 90B of one, some or each of the radial inner fingers 84B may be uniform (e.g., constant) along a portion or an entirety of an axial length of the respective finger 84B. Alternatively, the lateral width 90B of one, some or each of the radial inner fingers 84B may change along a portion or the entirety of the axial length of the respective finger 84B to provide the respective finger 84B with, for example, a tapered geometry.

The radial inner fingers 84B are arranged side-by-side in a spaced manner so as to form a plurality of radial inner (e.g., axial, axially extending) slots 92B in an array about the axial centerline 30. Each of these radial inner slots 92B is formed by and is located laterally between a respective laterally neighboring (e.g., adjacent) pair of the radial inner fingers 84B. Each of the radial inner slots 92B extends completely radially through a body/ply of material that forms the radial inner fingers 84B. Each of the radial inner slots 92B extends partially axially into the aft end portion 80 from the aft end 78 to the base 86B. A lateral width 94B of one, some or each of the radial inner slots 92B may be uniform (e.g., constant) along a portion or an entirety of an axial length of the respective slot 92B. Alternatively, the lateral width 94B of one, some or each of the radial inner slots 92B may change along a portion or the entirety of the axial length of the respective slot 92B to provide the respective slot 92B with, for example, a tapered geometry.

Figure 6:
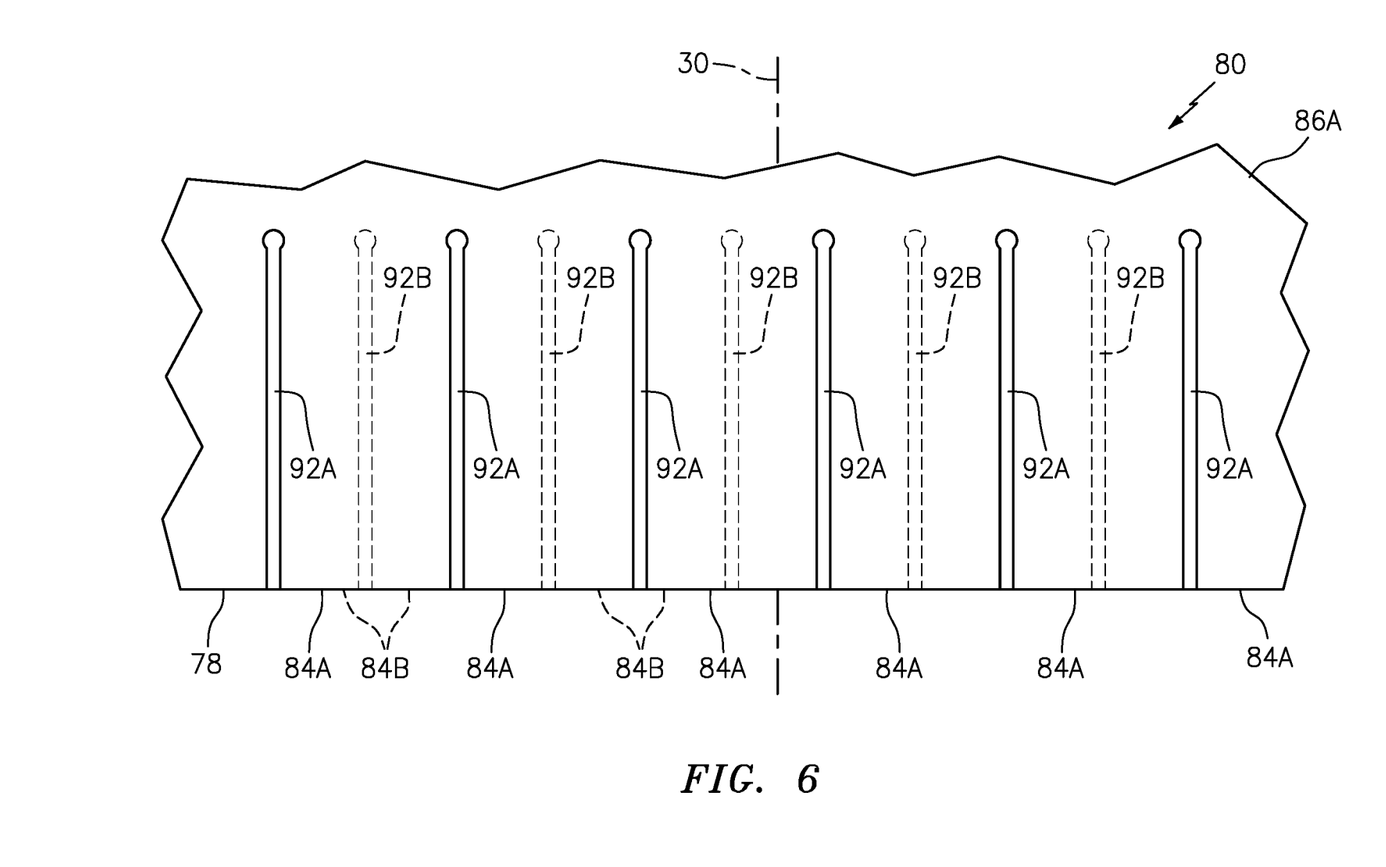
FIG. 6 is a partial side view illustration of an aft end portion of a nacelle inner structure configured with the radial outer and inner fingers.
Figure 7:
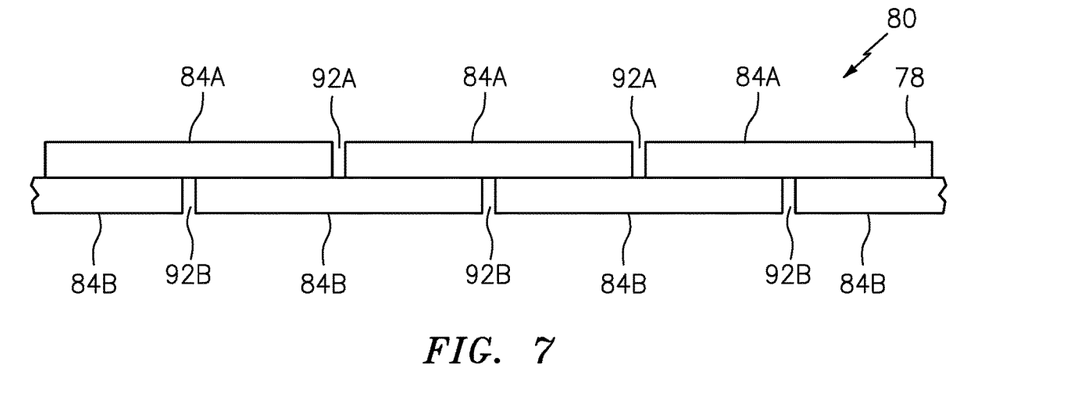
FIG. 7 is a partial end view illustration of the aft end portion of the nacelle inner structure.

Referring to FIGS. 6 and 7, the radial outer fingers 84A may be circumferentially staggered with the radial inner fingers 84B. One, some or each of the radial outer fingers 84A, for example, may (e.g., laterally and/or axially) overlap and thereby at least partially or completely cover a respective one of the radial inner slots 92B. Each radial outer finger 84A of FIGS. 6 and 7, for example, partially laterally overlaps and radially engages (e.g., contacts) adjacent segments of a respective neighboring pair of the radial inner fingers 84B. Each radial outer finger 84A may thereby substantially seal a corresponding one of the radial inner slots 92B. Similarly, one, some or each of the radial inner fingers 84B may (e.g., laterally and/or axially) overlap and thereby at least partially or completely cover a respective one of the radial outer slots 92A. Each radial inner finger 84B of FIGS. 6 and 7, for example, partially laterally overlaps and radially engages (e.g., contacts) adjacent segments of a respective neighboring pair of the radial outer fingers 84A. Each radial inner finger 84B may thereby substantially seal a corresponding one of the radial outer slots 92A.

Figure 8A:
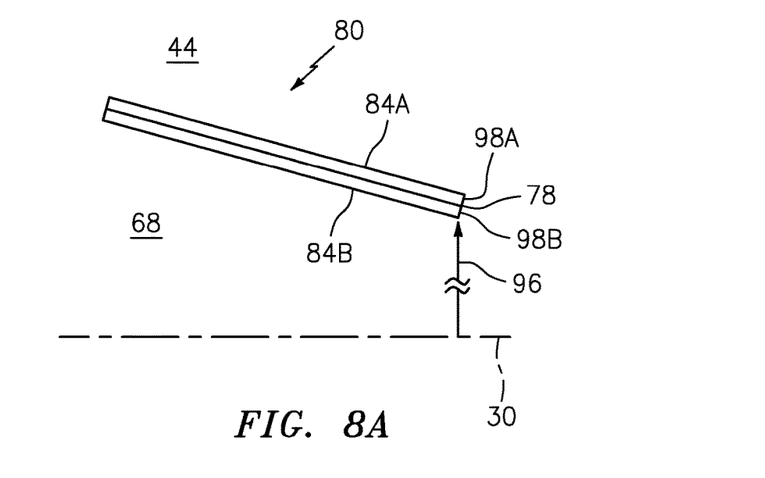
FIG. 8A is a side sectional illustration of the aft end portion of the nacelle inner structure with the fingers in radial inner positions.
Figure 8B:
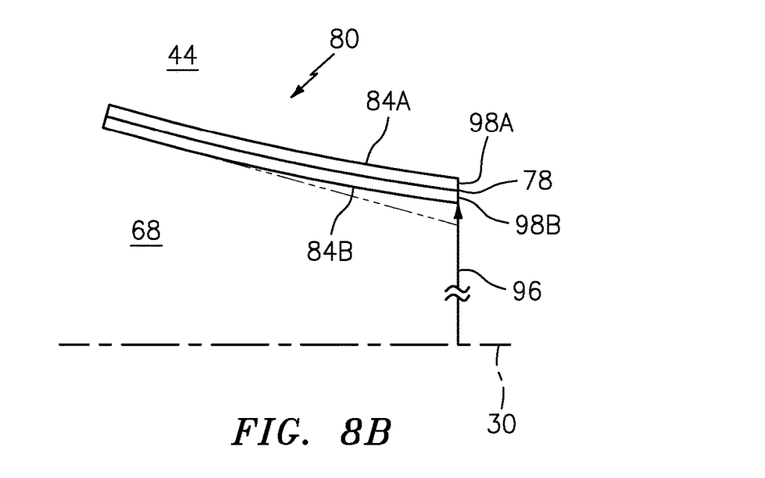
FIG. 8B is a side sectional illustration of the aft end portion of the nacelle inner structure with the fingers in radial outer positions.

With the foregoing configuration, each radial outer finger 84A may flex, deform, deflect and/or otherwise move independent of the other radial outer fingers 84A. Similarly, each radial inner finger 84B may flex, deform, deflect and/or otherwise move independent of the other radial inner fingers 84B. Thus, referring to FIGS. 8A and 8B, a radius 96 of the aft end portion 80 is operable to resiliently (i.e., not permanently) expand as the fingers 84 move radially outward to provide a larger compartment exhaust cross-sectional area under abnormal (e.g., burst duct) conditions. In other words, at least a distal end 98A, 98B (generally referred to as "98") of each axial finger 84 is operable to move from a radial inner position (see FIG. 8A) to a radial outer position (see FIG. 8B) when the fluid pressure within the internal compartment 68 is above the predetermined value so as to force that axial finger 84 outward. However, if and when the fluid pressure within the internal compartment 68 falls below the predetermined threshold, the distal end 98 of each axial finger 84 is operable to move back from the radial outer position (see FIG. 8B) to the radial inner position (see FIG. 8A). Since the foregoing movement of each axial finger 84 is triggered and caused by a change in the fluid pressure within the internal compartment 68, the movement of the axial fingers 84 may be termed "passive".

While each of the axial fingers 84 is described above as being resiliently deformable, the present disclosure is not limited thereto. One or more or each of the axial fingers 84A and/or 84B, for example, may alternatively be configured to permanently deform (e.g., deflect, yield, etc.) as the distal end 98 of the respective axial finger 84 moves radially outward from its radial inner position (see FIG. 8A) to its radial outer position (see FIG. 8B). Thus, even after the fluid pressure within the internal compartment 68 falls below the predetermined threshold, the distal end 98 of each (permanently deformed) axial finger 84 may remain at the radial outer position (see FIG. 8B), or alternatively partially retract and thereafter remain at some radial intermediate position between the radial outer and inner positions. In such embodiments, however, those axial fingers 84A, 84B which do permanently deform may be configured to remain intake; e.g., remain connected to its respective base 86A, 86B. Thus, even after permanent deformation, the axial fingers 84 may not break off and depart the propulsion system 26.

In some embodiments, referring to FIG. 1, provision of the aft end portion 80 enables the inner structure 36 to be configured without another apparatus for relieving the fluid pressure within the internal compartment 68. The inner structure 36, for example, may be configured without a pressure relief door. Of course, in other embodiments, the inner structure 36 may also include one or more pressure relief doors such as, but not limited to, the pressure relief door 912 as described in the background.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inner structure extending axially along and circumferentially about an axial centerline, the nacelle inner structure comprising an internal compartment and a cowl;
   the internal compartment configured to house a core of a gas turbine engine;
   the cowl configured to form an outer radial periphery of the internal compartment, and an aft end portion of the cowl further configured to form an outer radial periphery of a compartment exhaust to the internal compartment;
   the aft end portion of the cowl comprising a plurality of first axial fingers arranged circumferentially about the axial centerline in a first array, and each of the plurality of first axial fingers configured to deflect radially outward when fluid pressure within the internal compartment rises over a predetermined value;
   the aft end portion of the cowl further comprising a plurality of second axial fingers arranged circumferentially about the axial centerline in a second array;
   the first array radially outboard of and overlapping the second array; and
   a core nozzle configured to form an inner radial periphery of the compartment exhaust and to form an outer radial periphery of a core exhaust.

2. The assembly of claim 1, wherein each of the plurality of first axial fingers is configured to passively move between a radial inner position and a radial outer position.

3. The assembly of claim 1, wherein one or more of the plurality of first axial fingers are configured to passively move to change a cross-sectional area of the compartment exhaust.

4. The assembly of claim 1, wherein a slot is formed by and between a neighboring pair of the plurality of first axial fingers.

5. The assembly of claim 4, wherein the slot extends axially into the cowl from an aft end of the cowl.

6. The assembly of claim 1, wherein a first of the plurality of first axial fingers axially and circumferentially overlaps a neighboring pair of the plurality of second axial fingers.

7. The assembly of claim 1, wherein a first of the plurality of second axial fingers axially and circumferentially overlaps a neighboring pair of the plurality of first axial fingers.

8. The assembly of claim 1, wherein the plurality of first axial fingers and the plurality of second axial fingers are circumferentially staggered.

9. The assembly of claim 1, wherein a first of the plurality of first axial fingers radially engages a first of the plurality of second axial fingers.

10. The assembly of claim 1, wherein the cowl is further configured to form an inner radial periphery of a bypass flowpath within the aircraft propulsion system.

11. The assembly of claim 1, further comprising the gas turbine engine.

12. An assembly for an aircraft propulsion system, comprising:
    a nacelle inner structure comprising an internal compartment and an inner barrel;
    the internal compartment configured to house a core of a gas turbine engine;
    the inner barrel extending circumferentially about and axially along the internal compartment, and an aft end portion of the inner barrel configured to at least partially form a compartment exhaust for the internal compartment;
    the aft end portion of the inner barrel further configured to passively deform to increase a cross-sectional area of the compartment exhaust when fluid pressure within the internal compartment rises above a predetermined value;
    the aft end portion of the inner barrel comprising a plurality of first fingers and a plurality of second fingers;
    the plurality of first fingers arranged in a first array about an axial centerline;
    the plurality of second fingers arranged in a second array about the axial centerline; and
    a surface of a first of the plurality of first fingers configured to radially engage a surface of a first of the plurality of second fingers.

13. The assembly of claim 12, wherein the first array circumscribes and is configured to radially engage the second array.

14. The assembly of claim 12, wherein
    each of the plurality of first fingers is configured to radially contact each second finger in a respective neighboring pair of the plurality of second fingers; and
    each of the plurality of second fingers is configured to radially contact each first finger in a respective neighboring pair of the plurality of first fingers.

15. An assembly for an aircraft propulsion system, comprising:
    a nacelle inner structure comprising an internal compartment and an inner barrel, an aft end portion of the inner barrel configured to at least partially form a compartment exhaust for the internal compartment, the compartment exhaust configured to direct fluid out of the internal compartment into an environment outside of the aircraft propulsion system; and
    a gas turbine engine comprising an engine core housed within the internal compartment;
    wherein the aft end portion of the inner barrel comprises a plurality of slots arranged circumferentially about an axial centerline of the aircraft propulsion system, each of the plurality of slots extends partially axially into the inner barrel from an aft end of the inner barrel, and a first of the plurality of slots having a lateral width that is uniform along at least a portion of a length of the first of the plurality of slots.

16. The assembly of claim 15, wherein
    the aft end portion of the inner barrel comprises a plurality of fingers arranged circumferentially about the axial centerline; and
    each of the plurality of slots is formed by and located between a respective circumferentially adjacent pair of the plurality of fingers.

* * * * *